June 16, 1931.  H. L. YOUNG  1,810,586
TUBE MAKING METHOD AND APPARATUS
Filed Sept. 1, 1928   9 Sheets-Sheet 6
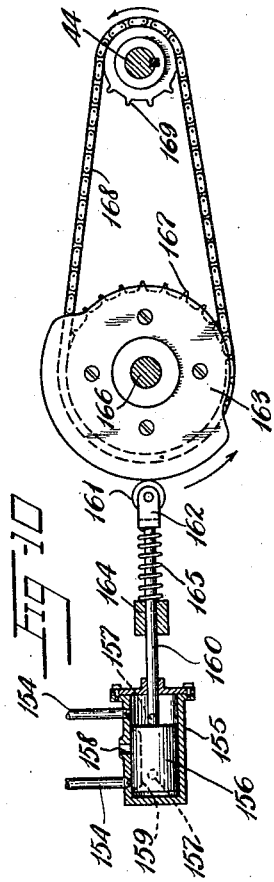
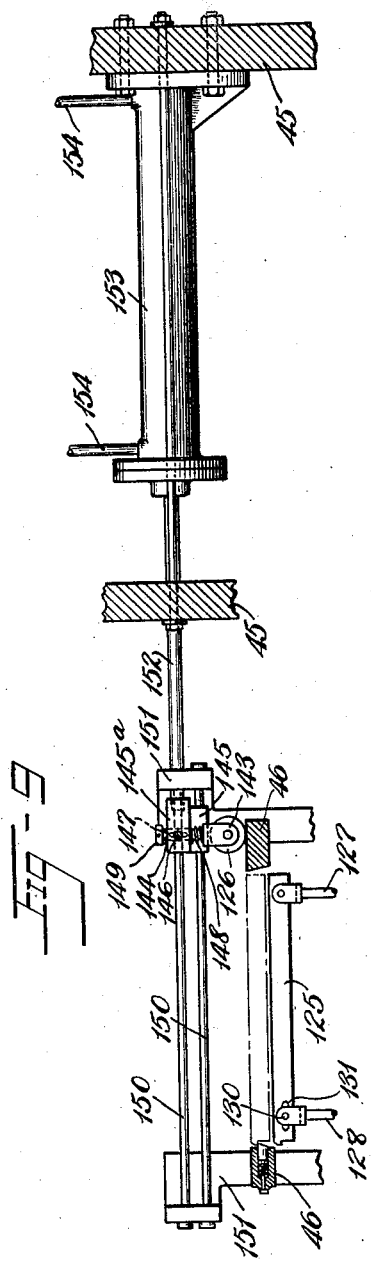
Inventor
Harvey L. Young
By Eakin & Avery
Attys.

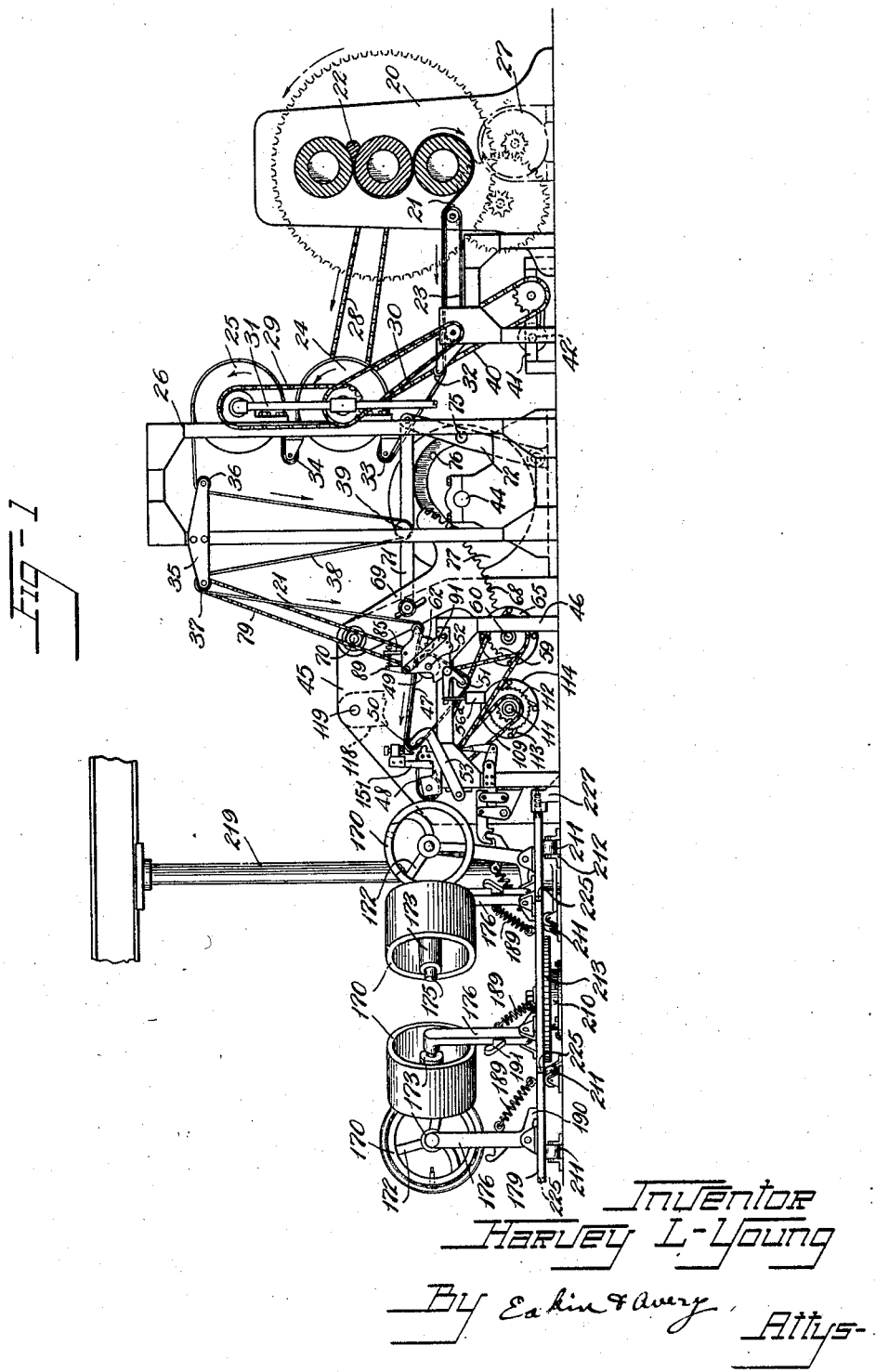

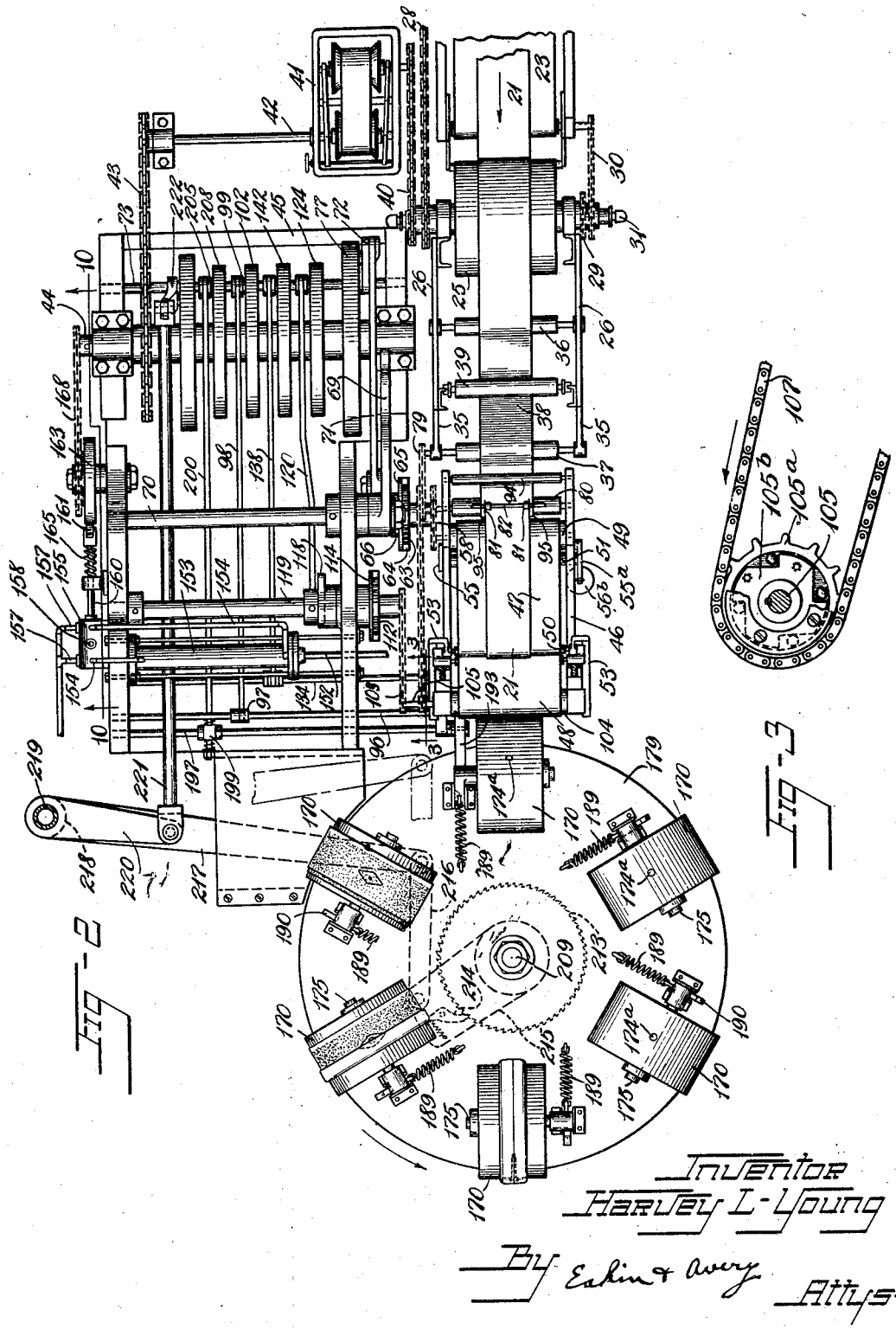

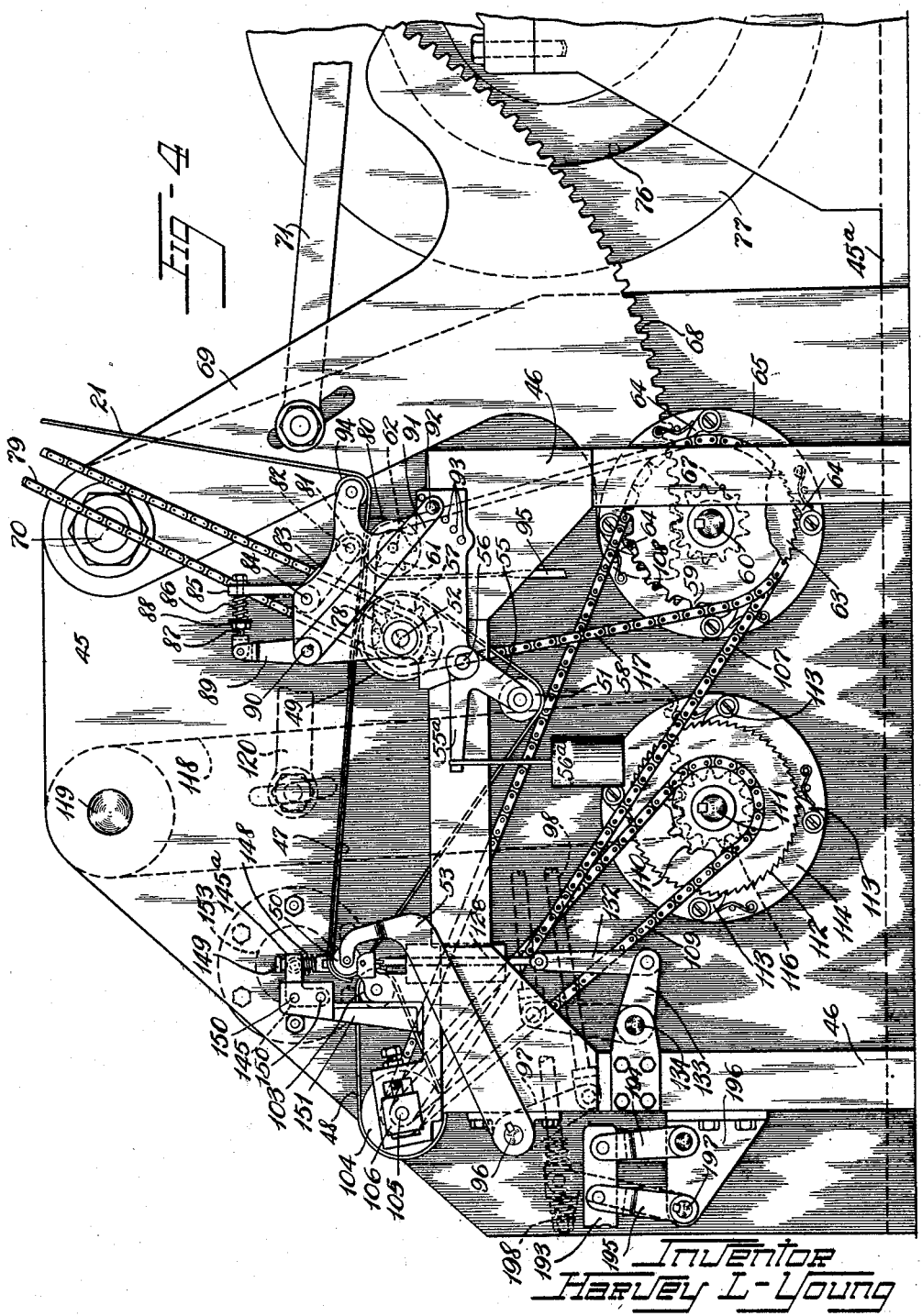

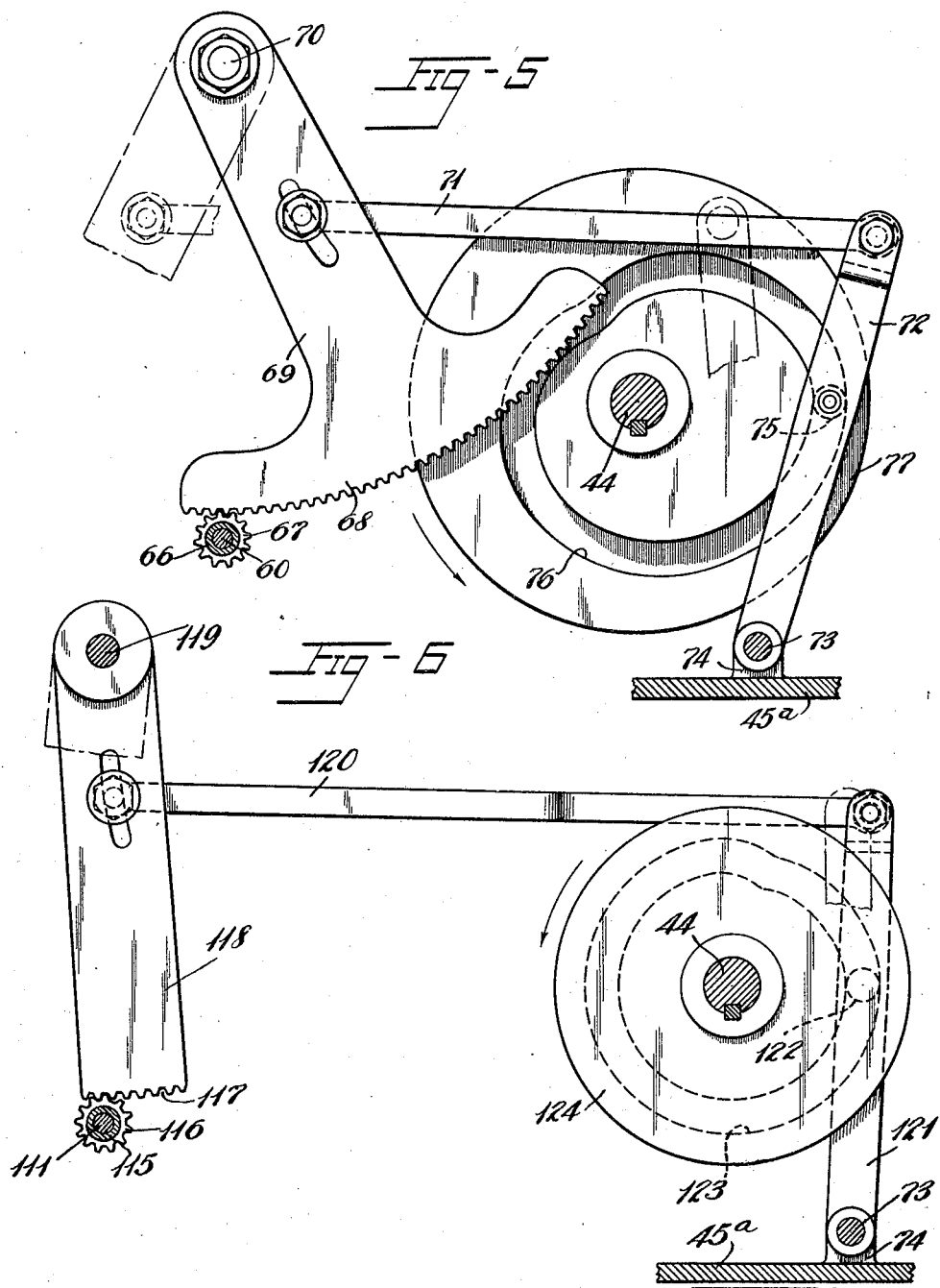

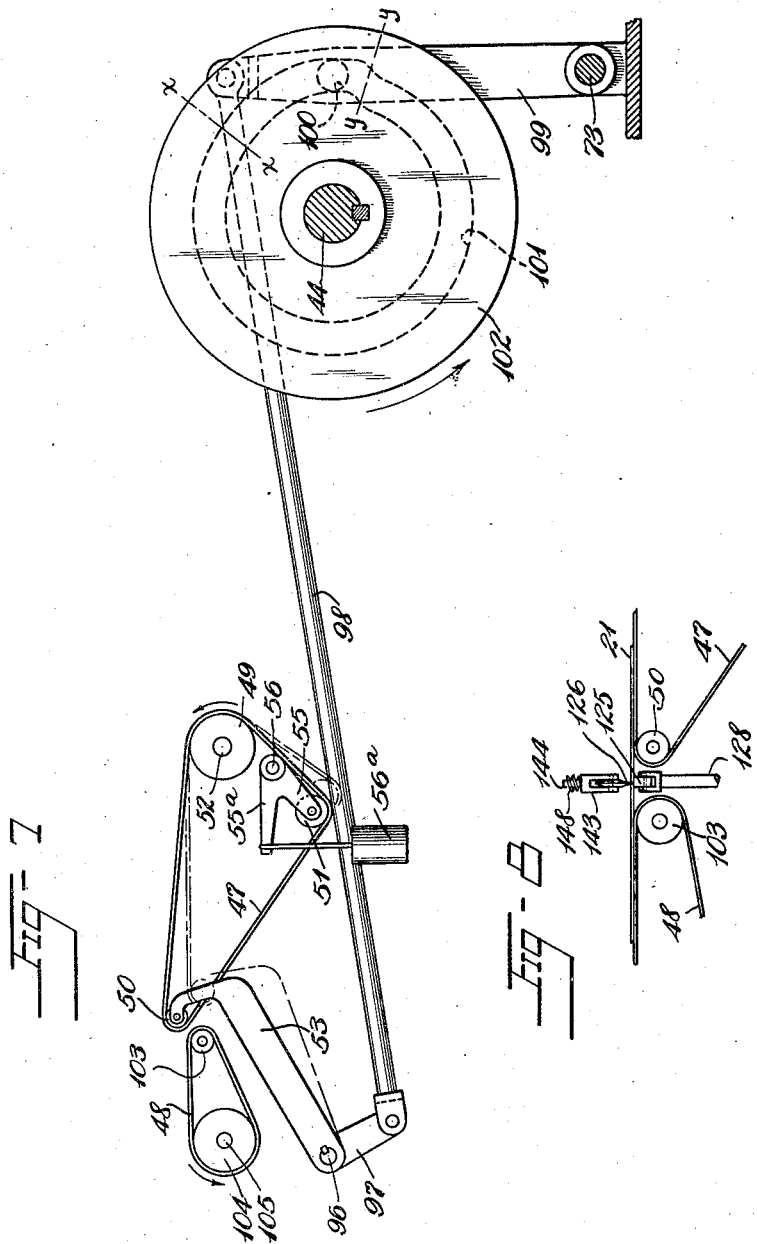

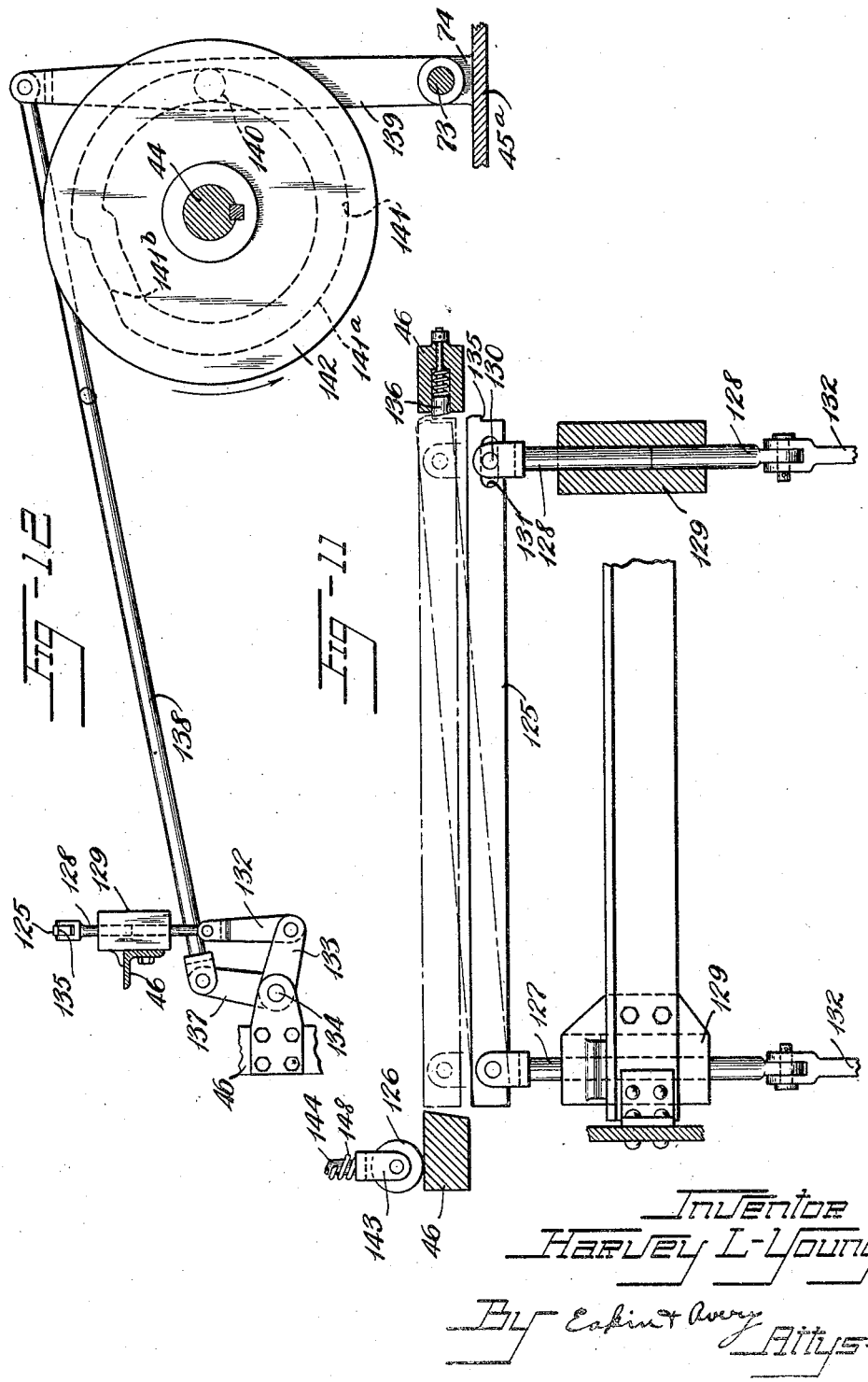

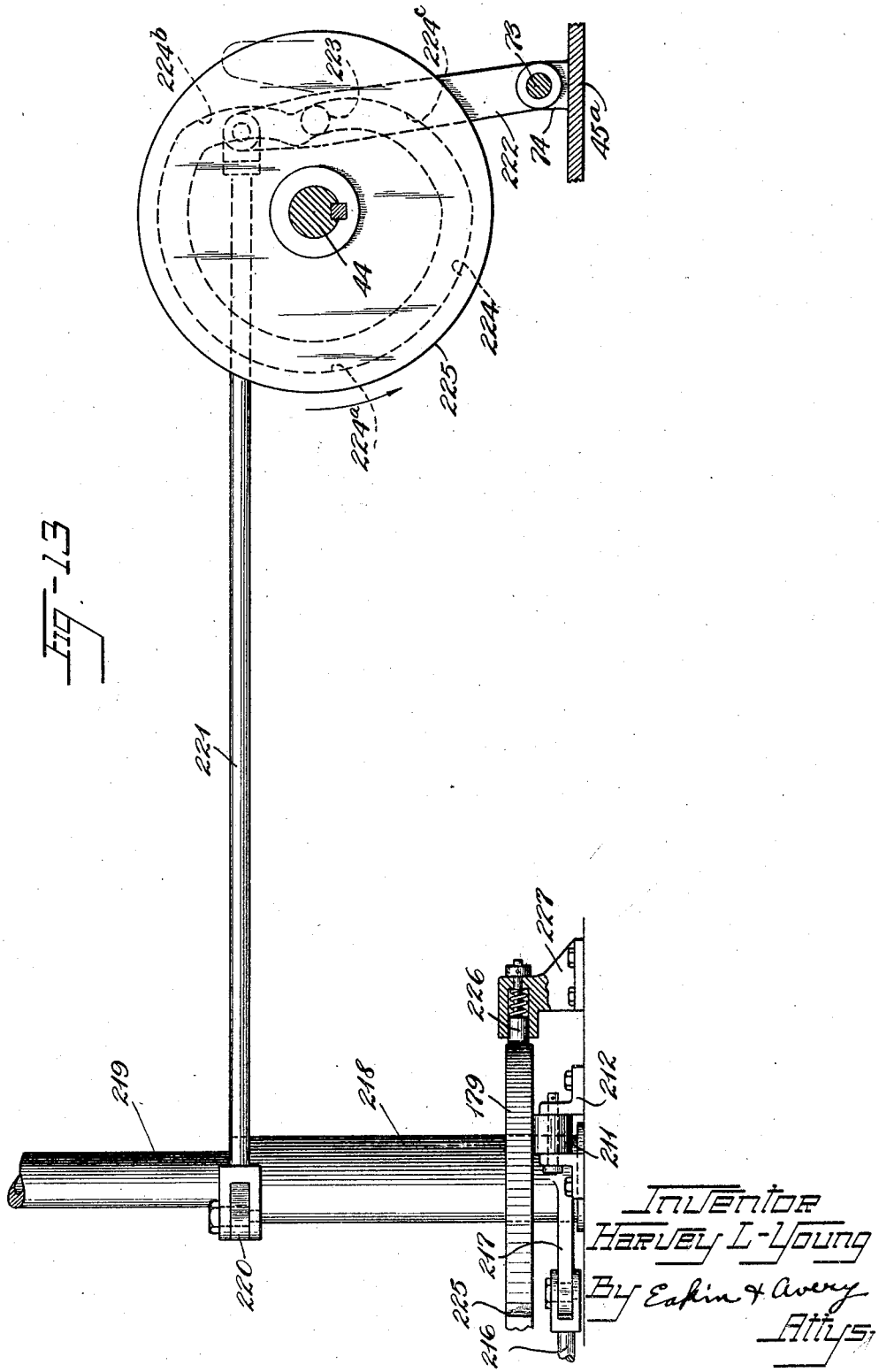

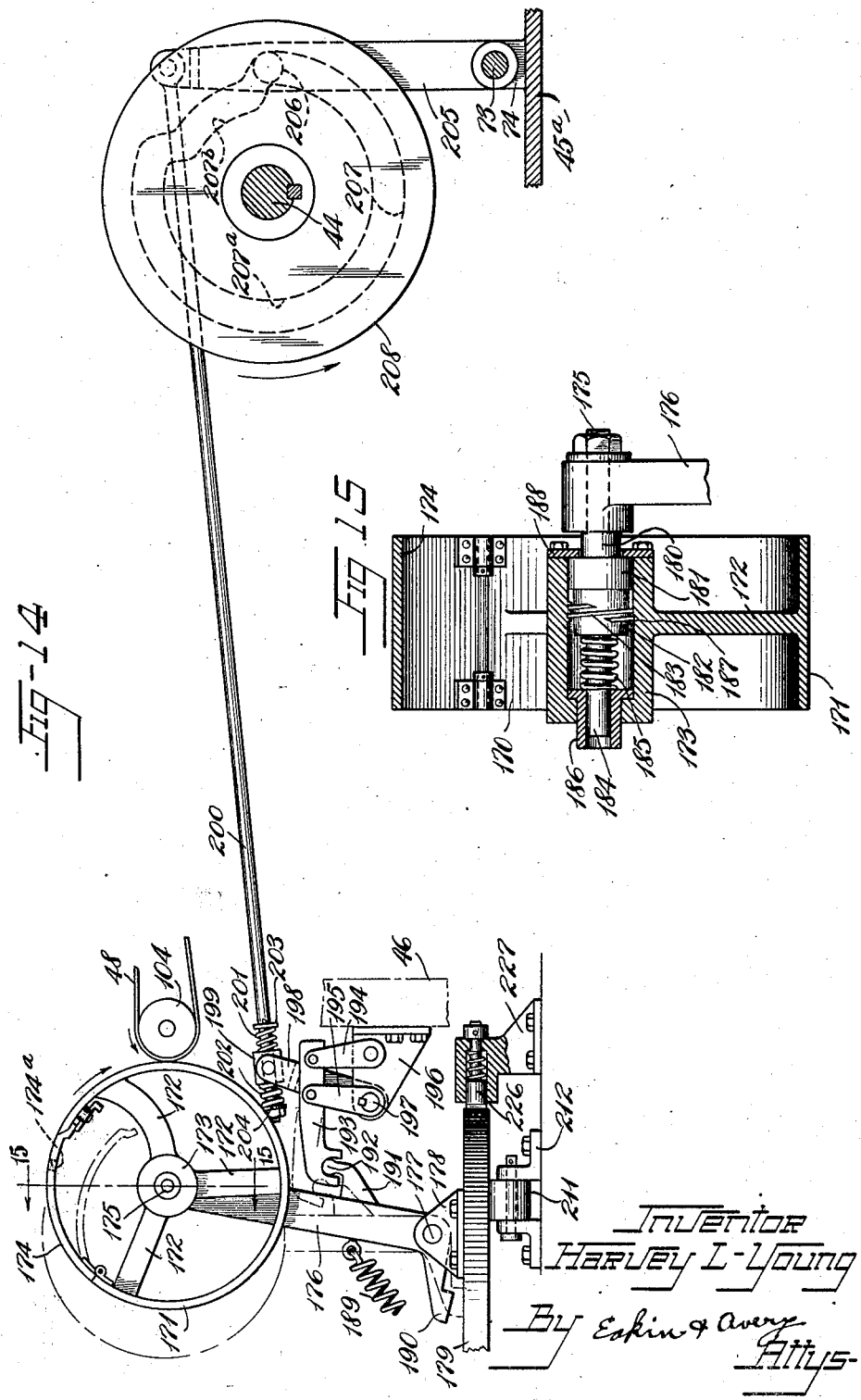

Patented June 16, 1931

1,810,586

UNITED STATES PATENT OFFICE

HARVEY L. YOUNG, OF AKRON, OHIO, ASSIGNOR TO THE B. F. GOODRICH COMPANY, OF NEW YORK, N. Y., A CORPORATION OF NEW YORK

TUBE-MAKING METHOD AND APPARATUS

Application filed September 1, 1928. Serial No. 303,417.

This invention relates to the art of making inner tubes for pneumatic tires, and especially to improved procedure and apparatus for making inner tubes from warm plastic sheet material such as a rubber composition as the same is delivered in a continuous strip from a calender.

The invention is in some of its features an improvement upon my earlier invention described and claimed in my patent application filed January 8, 1926, Serial No. 80,027, which has matured into Patent No. 1,800,332, April 14, 1931, and its chief objects are to avoid wrinkles in the blanks of sheet material from which the tubes are made; to provide for accurate positioning of the blanks or sheets upon a conveyor so that they may be fed accurately to associated tube-forming mechanism; and in general, to provide largely automatic apparatus for the economical manufacture of inner tubes, and to avoid the accumulation of waste material. Other objects will be manifest as the specification proceeds.

Of the accompanying drawings:

Fig. 1 is a side elevation of apparatus embodying and adapted to carry out my invention in its preferred form, part being broken away and in section.

Fig. 2 is a plan view of a portion of the apparatus shown in Fig. 1, parts being broken away and in section.

Fig. 3 is a section on line 3—3 of Fig. 2.

Fig. 4 is a side elevation, on a larger scale, of the sheet-feeding, trimming, and severing mechanism.

Fig. 5 is a detail side elevation, partly in section, showing mechanism for concurrently driving two sheet-conveyors and means for trimming the lateral margins of a sheet thereon.

Fig. 6 is a detail side elevation of mechanism for driving one of said sheet-conveyors while the other sheet-conveyor is stationary.

Fig. 7 is a detail side elevation of mechanism for manipulating one of the sheet-conveyors to alter its position with relation to the other sheet-conveyor.

Fig. 8 is a fragmentary detail of the adjacent ends of the sheet-conveyors, and cutting mechanism associated therewith, during the severing of blanks from a continuous sheet of material.

Fig. 9 is a side elevation of a sheet cutter, a cutting bar adapted to cooperate therewith, and a fluid-pressure operated cylinder for manipulating the cutter.

Fig. 10 is a section on line 10—10 of Fig. 2 showing means for actuating said fluid-pressure cylinder at timed intervals.

Fig. 11 is a detail side elevation of the cutting bar and associated parts.

Fig. 12 is an end elevation of the cutting bar showing mechanism for manipulating the same.

Fig. 13 is a side elevation partly in section of mechanism for periodically indexing a turret adapted to support tube-building drums.

Fig. 14 is a side elevation of one of the tube-building drums and mechanism for moving the same into and out of operative association with one of the sheet-conveyors.

Fig. 15 is a section on line 15—15 of Fig. 14.

Referring to Fig. 1 of the drawings, 20 is a three roll rubber-working calender of usual type which is adapted to produce a continuous strip of plastic rubber, such as the strip 21, from a bank of rubber stock 22 fed into the bight of two of its rolls. At the delivery side of the calender is a short conveyor 23 for receiving the strip 21 as it issues from the calender and for delivering it to an adjacent vertical series of cooling drums 24, 25 journaled in a vertical framework 26. The calender is driven through the usual gearing from a motor 27, and a sprocket chain 28 from the calender 20 drives the cooling drum 24 which is connected by a sprocket chain 29 with the cooling drum 25 for driving the latter. A sprocket chain 30 from the cooling drum 24 drives the conveyor 23. The cooling drums 24, 25 are cooled by fluid circulated therein through piping 31, and suitably positioned guide rollers 32, 33, and 34 are provided for directing the strip 21 around the cooling drums so as to obtain maximum contact therewith.

Near the top of the framework 26 are spaced-apart bracket arms 35, 35 in which are journaled a pair of parallel rollers 36, 37 of which the latter is driven. The rollers 36, 37 are adapted to support the strip 21 as it is fed from the cooling drum 25, the strip falling in a reserve or storage loop 38 between said rollers, and supporting a floating roller 39 in said loop. The arrangement provides conveniently for storing a variable reserve of stock between apparatus for continuously delivering said stock and apparatus for intermittently utilizing the same.

A sprocket chain 40 from the driven cooling drum 24 drives a variable speed device 41 of known construction, and the driven shaft 42 of said device is connected by a sprocket chain 43 (Fig. 2) with a cam shaft 44 journaled in a suitable framework 45 behind the framework 26. The cam shaft 44 carries a plurality of cams which control the operation of various strip-manipulating instrumentalities and the drums upon which the strips, severed to suitable lengths, are wrapped in the manufacture of endless tubes such as inner tubes for pneumatic tires.

The strip-manipulating instrumentalities include means for feeding the strip intermittently, means for removing excess stock from the lateral margins of the strip to give it proper width and to position it upon the strip-feeding means, means for transversely severing the strip to provide lengths suitable for individual tubes, and means for manipulating the strip-feeding means to advance the leading end of the continuous strip past the strip-severing means. The aforesaid instrumentalities are mounted upon a framework 46 positioned in front of the framework 45 and in alignment with the framework 26.

The strip-feeding means comprises a pair of intermittently driven endless conveyor belts 47, 48 which in their normal strip-feeding and strip-severing positions have their upper, stock-supporting reaches longitudinally spaced from each other and aligned in the same plane, as indicated by the broken-line position of the conveyor 47 in Fig. 7 and their full-line positions shown in Fig. 8. The conveyor 47 is adapted to be manipulated at determinate intervals during the operation of the apparatus, to position its strip-delivery end over and above the strip-receiving end of the conveyor 48, to carry the leading end of the continuous strip into position to be fed onto the conveyor 48, after each severing operation, the latter operation being effected in the gap between the two conveyors while their upper reaches are in horizontal alignment and closely adjacent each other.

The conveyor 47 is supported at three points upon rollers 49, 50, 51 of which the roller 49 is mounted upon a shaft 52 journaled in the framework 46 and intermittently driven by mechanism presently to be described, and the roller 50 is journaled in the ends of a pair of pivoted arms 53, 53 which are adapted to carry the delivery end of the conveyor over and above the receiving end of the conveyor 48 as aforementioned. The roller 51 which serves as a belt tightener and permits the delivery end of the conveyor to be manipulated as described is journaled in the free ends of a pair of arms 55, 55 mounted upon the respective ends of a shaft 56 journaled in the opposite sides of the framework 46, and one of said arms 55 is formed with an angular extension 55ª upon which is suspended a weight 56ª, the arrangement being such that the belt 47 always is drawn taut.

For intermittently driving the belt 47 in one direction, the shaft 52 is provided with a sprocket 57 connected by a sprocket chain 58 with a sprocket 59, Fig. 4, mounted upon a shaft 60 journaled in the framework 45, and the sprocket chain 58 also passes over a sprocket 61 mounted upon a shaft 62 journaled in the framework 46 parallel to the shaft 52 and close to the strip-receiving end of the conveyor 47 for purposes presently to be described. Also secured on the shaft 60, behind the sprocket 59, is a ratchet disc 63 the teeth of which are engaged by a plurality of spring-pressed pawls 64, 64 mounted upon a disc or pawl plate 65 which is mounted upon a sleeve 66, Fig. 5, journaled upon the shaft 60. Also mounted upon the sleeve 66 is a gear pinion 67 meshed with gear segment 68 formed on the free end of an oscillating arm 69 pivoted at 70 upon the framework 45. A pitman 71 is pivotally secured in a slot in the arm 69 adjustably to connect the latter with the free end of a lever arm 72 which has its other end fulcrumed upon a journal bar 73 parallel to the shaft 44 and mounted in a plurality of ears 74, 74 rising from the floor plate 45ª of the framework 45. A cam roller 75 projects laterally from the central portion of the lever arm 72 and extends into a cam groove 76 formed in the face of a face cam 77 mounted upon the cam shaft 44.

The arrangement is such that rotation of the cam 77 moves the arm 69 slowly in a direction to feed the conveyor 47 forward through the pinion 67, pawls 64, ratchet 63, sprocket 59, chain 58 and belt roller 49, and then quickly in a direction to retract the arm while the pawls 64 slide backward over the teeth of the ratchet 63 and the sprocket 59 and conveyor 47 are motionless.

A sprocket 78, Fig. 4, is mounted upon the shaft 52 and connected by a sprocket chain 79 with a sprocket on the shaft of the driven roller 37 at the delivery side of the storage loop 38 of the strip 21, for feeding the strip forward to the strip-manipulating mechanism whenever the conveyor 47 of the latter is advanced.

Before the strip 21 from the storage loop passes onto the conveyor 47 its lateral marginal portions are trimmed of surplus stock. For this purpose a hardened metal roll 80 is mounted upon the shaft 62, and cooperating with said roll is a pair of disc knives 81, 81 mounted for axial adjustment upon a shaft 82 journaled at its respective ends in the free ends of a pair of arms 83, 83 secured to a shaft 84 journaled in the framework 46. A finger 85 secured to the shaft 84 and extending upwardly therefrom has its free end engaged by one end of a compression spring 86 mounted upon a rod 87, the spring having its other end bearing against a nut 88 thereon, the rod 87 being pivotally secured at one end to the free end of an arm 89 and having its other end extending freely through an aperture in the free end of the finger 85. The arm 89 is mounted upon a shaft 90 journaled in the framework 46 parallel to the shaft 84. The shaft 90 is adjustable angularly, to vary the pressure of the spring 86 against the finger 85 and thereby to vary the pressure of the knives 81 against the roll 80, by means of a lever 91 secured at one end to an end of the shaft 90 and having its other end provided with a detent 92 adapted to seat in one of an arcuate series of complemental recesses 93, 93 formed in the framework 46 for holding the lever 91 in fixed position.

A guide roller 94 is journaled in the framework 46 above and beside the roll 80, and the strip 21 from the storage loop passes under said roller before passing over the roll 80 where surplus stock, such as the strip 95, is severed from its marginal portions by the knives 81, the strip 21 thereafter passing onto the conveyor 47 and lying in proper position thereon. The knives 81 may be axially adjusted upon their shaft 82 to provide for limited variation in the position of the strip 21 upon the conveyor 47, and accuracy of positioning is obtained by trimming the strip immediately before it passes onto said conveyor.

For raising the delivery end of the conveyor 47 over and above the receiving end of the conveyor 48, at determinate time intervals with relation to the feed of the conveyor 47, the arms 53 which carry the roller 50 are mounted upon a rock shaft 96 which is journaled upon the framework 46 and extends rearwardly through the framework 45, the rock shaft 96 being provided with a downwardly-extending rocker arm 97 connected by a pitman 98 with the free end of a lever 99 pivotally mounted upon the journal bar 73. A cam roller 100 projects laterally from an intermediate position on the lever 99 and extends into a cam groove 101 formed in a face cam 102 mounted upon the cam shaft 44.

As shown in Fig. 7 the cam groove 101 has a uniformly-concentric zone extending from the line $y-y$ and $x-x$, which zone comprises the major portion of the cam groove and functions to maintain the roller 50 in its lower position and the conveyor 47 in the broken-line position of Fig. 7. From $x-x$ to $y-y$ the cam groove 101 is volute in form with a gradually increasing radius until the maximum is reached, and an abrupt curve where it cuts inwardly to join the concentric portion of the groove. This portion of the cam groove controls the gradual rise of the roller 50 to the full-line position of Fig. 7 and causes its quick retraction to the broken-line normal position shown therein.

The conveyor 48 is mounted upon rollers 103, 104 of which the roller 103, at the receiving end of the conveyor, is journaled in a fixed position in the framework 46, and the roller 104 is mounted upon a shaft 105 which is journaled in slide blocks, such as the slide block 106, adjustably mounted in said framework, the arrangement permitting the conveyor to be kept taut.

The conveyor 48 is adapted to be driven concurrently with the conveyor 47 to feed the strip 21 across the gap between the said conveyors, then to be held stationary with the conveyor 47 while the strip is severed, then to start in advance of and be driven independently of the conveyor 47 to deliver the severed portion of the strip, then to stop and remain stationary until the manipulation of the roller 50 is effected to position the delivery end of the conveyor 47 over its receiving end, and then to start again with the conveyor 47 to receive the leading end of the continuous strip 21. For driving the conveyor 48 concurrently with the conveyor 47, a sprocket $105^a$ is mounted upon the shaft 105 by means of a ball clutch $105^b$, Fig. 3, and is connected by a sprocket chain 107 with a sprocket 108 mounted upon the intermittently-driven shaft 60 which also drives the conveyor 47.

For driving the conveyor 48 independently of the conveyor 47 a sprocket chain 109 connects the shaft 105 with a sprocket 110 mounted upon a shaft 111 journaled in the framework 45, and a ratchet 112 also mounted upon the shaft 111 has its teeth engaged by spring-pressed pawls 113 mounted upon a disc or pawl plate 114 which is secured upon a sleeve 115 (Fig. 6) journaled upon the shaft 111. A gear pinion 116 is mounted upon the sleeve 115 and meshes with a gear segment 117 formed upon the free end of an oscillating arm 118 pivoted at 119 in the framework 45. A pitman 120 is pivotally secured in a slot in the arm 118 adjustably to connect the latter with the free end of a lever arm 121 which has its other end fulcrumed upon the journal bar 73. A cam roller 122 projecting laterally from the lever arm 121 extends into a cam groove 123 formed in a face cam 124 mounted upon the cam shaft 44.

The arrangement is such that rotation of the cam 124 moves the arm 118 quickly toward the broken-line position of Fig. 6 to drive the conveyor 48 forward, through the pinion 116, pawls 113, ratchet 112, sprocket 110, sprocket chain 109, and belt roller 104, and then slowly to retract the arm while the pawls 113 slide backward over the teeth of the ratchet 112 and the sprocket 110 and conveyor 48 are stationary. During this forward movement of the conveyor 48 the sprocket chain 107 is stationary since the ball clutch 105$^b$ is arranged to provide driving mechanism between the shaft 105 and sprocket 105$^a$ only when the latter is driven by the sprocket chain 107 moving in the direction of the arrow in Fig. 3. This forward movement of the conveyor 48 is completely effected while the conveyor 47 is stationary.

For severing blanks suitable for the manufacture of inner tubes or the like from the continuous strip 21, I provide a cutting bar 125 and a rotary disc knife 126 adapted to cooperate therewith, said bar and knife being positioned respectively below and above the sheet 21 at the gap normally between the conveyors 47, 48 as shown in Fig. 8. The bar 125 is adapted to be raised to bring it into engagement with the sheet 21 which spans said gap, and the knife 126 is adapted to be reciprocated along the bar, transversely of the sheet 21, to sever said strip when moving in either direction. The supports for the knife 126 are somewhat above the knife itself, and the width of the conveyor 47 is sufficiently narrower than the range of travel of the knife to permit the delivery end of the conveyor 47 to be positioned over and above the receiving end of the conveyor 48 and below the knife support, when the knife is positioned at either end of its path. After the severing operation, one end of the bar 125 is lowered before its other end to effect progressive separation of the bar and the strip 21.

The cutting bar 125 is supported from its end portions upon the upper ends of a pair of vertical push rods 127, 128 slidably mounted in guides 129, 129 mounted upon the framework 46, the push rods being pivotally secured to the bar 125, and the pivot pin 130 of the push rod 128 being mounted in a horizontal slot 131 in said bar. The push rod 128 is formed in two separable parts, as shown in Fig. 11, and the lower ends of the push rods 127, 128 are connected with the upper ends of links 132, 132, which are pivotally connected to respective arms, such as the arm 133, (Fig. 4) mounted upon a rock shaft 134 journaled in the framework 46.

That end of the bar 125 which includes the slot 131 is formed with an outstanding lip 135 adapted to pass over and be engaged by a spring-pressed latch or detent 136, mounted in the framework 46, during the upward movement of the bar 125. The detent 136 is adapted to support the adjacent end of the bar 125 during the downward movement of the push rods 127, 128 at which time the two parts of the latter separate and the upper part thereof remains suspended from the bar, while the downward movement of the push rod 127 imparts an initially inclined position to the bar, as shown, to effect a progressive separation of the bar from the strip 21 after the strip-severing operation. At the lowermost position of the push rod 127 the angle of the bar 125 is such that the lip 135 is disengaged from the detent 136 which permits that end of the cutting bar 125, and the attached portion of the push rod 128, to drop so that the bar 125 is horizonal in its lower position.

For effecting angular movement of the rock shaft 134 at timed intervals with relation to the movements of the conveyors 47, 48, a lever 137 is mounted upon the rock shaft and its free end is connected by a pitman 138 with the free end of a lever 139 fulcrumed at its other end upon the journal bar 73. A cam roller 140 projects laterally from the lever 139 and extends into a cam groove 141 formed in a face cam 142 mounted upon the cam shaft 44. The cam groove 141 comprises a relatively long arcuate portion 141$^a$ concentric with the shaft 44 in which region the cam maintains the bar 125 in lowered inoperative position, and a relatively short portion 141$^b$ of lesser radius in the region of which the cam raises the said bar and holds it elevated.

The disc knife 126 which cooperates with the cutting bar 125 for severing the strip 21, is journaled in a forked holder 143 formed with a stem 144 which is slidably mounted for vertical movement in a laterally extending portion 145$^a$ of an angular bracket 145. A set screw 146 is threaded through the wall of the bracket portion 145$^a$ and into a longitudinal slot 147 formed in the stem 144 to prevent angular movement of the latter. A compression spring 148 is mounted upon the stem 144 between the knife holder 143 and the bracket portion 145$^a$ to force the knife normally downward toward the cutting bar 125, and a retaining collar 149 is mounted upon the other end of the stem 144 to hold the stem in its bracket.

The bracket 145 is mounted for sliding movement upon a pair of parallel supporting rods 150, 150 disposed in a vertical plane above the roller 103 and transversely of the conveyor 48, said rods 150 being mounted with their end portions in respective brackets 151, 151 mounted upon the framework 46. The bracket 145 is connected to the outer end of the piston rod 152 of a double acting fluid pressure cylinder 153, the latter being suitably mounted in horizontal position in the framework 45 and provided at its opposite ends with fluid inlet and outlet pipes 154, 154, from a valve 155.

The valve 155 (see Fig. 10) comprises a hollow cylinder in which is mounted a reciprocable piston 156, and the pipes 154 connect with the cylinder adjacent its respective ends as do inlet pipes 157, 157 from a source of fluid pressure. An exhaust port 158 is formed in the central region of the cylinder 155, and the piston 156 is formed with a longitudinal groove 159 which is so arranged therein as to provide a passage alternatively from either pipe 154 to the exhaust port 158 as the piston is reciprocated in the cylinder. The arrangement of the inlet pipes 157 is such that one inlet pipe is open and in communication with one pipe 154, through the cylinder 155 while the other inlet pipe 157 is closed and the other pipe 154 is in communication with the exhaust port 158, with the result that one end of the cylinder 153 is exhausted as its other end is charged.

For reciprocating the piston 156 of the valve 155, the piston rod 160 of said piston extends through the end wall of said cylinder and has a cam roller 161 journaled in a yoke 162 mounted upon its outer end, which cam roller engages a cam 163. The piston rod 160 is slidably mounted in a bracket 164 mounted upon the framework 45, and a compression spring 165 is mounted upon the piston rod between the bracket 164 and the yoke 162 for normally urging the cam roller 161 into engagement with the cam 163. The cam 163 is journaled upon a spindle 166 projecting laterally from the framework 45, and secured to said cam is a sprocket 167 connected by a sprocket chain 168 with a sprocket 169 mounted upon the cam shaft 44. The relative size of the sprockets 167, 169 is such that one revolution of the latter drives the sprocket 167 but half a revolution. The cam 163 is so formed that during one half a revolution the piston 156 is at one end of the cylinder 155 and at the other end during the other half of the cam's revolution, with the result that the knife 126 makes but one cycle of operation, across the cutting bar 125 and return, while the strip-feeding mechanism functions twice, the knife severing the strip 21 when moving in either direction.

The strips of stock severed from the continuous strip 21 are wrapped about respective drums 170, 170 which are successively presented to the delivery end of the conveyor 48 to receive the severed strip therefrom, and are rotated by frictional engagement with said conveyor 48 to wrap the strips upon their respective outer surfaces in a plurality of convolutions, means being provided on each drum for effecting concurrent axial movement of the drums to cause the strip to lie thereon in a helix so that the margins of the convolutions are offset from each other to produce an annular band having marginal portions of diminishing thickness from the edges.

Each drum 170 comprises a broad annular rim portion 171 connected by radial spokes 172, 172 to a hub portion 173, the rim portion 171 being sectional and provided with a hinged section 174 adapted to be swung inward to facilitate removal of an annular tube from the outer surface of the drum. The hinged section 174 preferably is formed with an aperture 174ª to accommodate a valve stem during the building of an inner tube on the drum.

The hub 173 is journaled upon a horizontal spindle 175 mounted in the upper end of an arm 176 pivoted at 177 in a bracket 178 mounted upon a turret or turntable 179. The spindle 175 is formed, from its base toward its free end, (Fig. 15) with a neck 180, an enlarged journal portion 181, a reduced portion 182 formed at its middle with an open-ended, male screw-thread 183 of two turns, and a further reduced centering and spring-post portion 184. A helical compression spring 185 is mounted upon the reduced portion 184 of the spindle, between the threaded portion 182 and a flanged bushing 186 slidably mounted upon the outer end portion of the spindle and retained and controlled as to its position thereon by engagement of its flange with an inwardly extending flange formed on the hub 173 of the building drum 170. The hub 173 is formed with an internal screw thread 187 adapted to coact with the thread 183 of the spindle to move the drum and the bushing 186 axially on the spindle toward the arm 176, against the force of the spring 185, when the drum is rotated in one direction as indicated by the arrow in Fig. 14, and to permit the spring to move the drum axially in the other direction when the drum is reversely rotated. The screw threads are adapted to pass out of mesh with each other and thus permit further rotation of the drum without substantial axial movement when it approaches the arm 176. An annular retaining plate 188, mounted upon the neck 180 of the spindle and secured to the hub of the drum by screw bolts, is adapted to abut the journal portion 181 of the spindle to stop the reverse axial movement of the drum with the screw threads still meshed.

The arms 176 normally stand in vertical position upon the turntable 179, respective tension springs 189, 189 being provided for urging the arms toward the vertical axis of the turret, and each arm being formed at its base with a foot portion 190 for limiting its movement in that direction.

The arms 176 are adapted to be drawn, against the pull of the springs 189, into an outwardly inclined position to cause the drums 170 to bear yieldingly against the delivery end of the conveyor 48, (Fig. 14) to be driven thereby as they are successively brought into proper alignment with said conveyor. For this purpose each arm 176 is provided with a laterally extending bracket 191 formed with an upstanding finger 192 having a rounded end portion. Said finger is adapted to be engaged by the downwardly-forked end portion of a horizontal arm 193 which is pivotally mounted upon the free ends of a pair of spaced-apart, non-parallel links 194, 195. The link 194 is pivotally mounted upon a bracket 196 extending from the framework 46, and the link 195 is mounted upon the end portion of a rock shaft 197 journaled in said bracket 196 and in the framework 45. The arrangement is such that rocking of the shaft 197 produces rectilinear movement of the arm 193, and the non-parallel arrangement of the links 194, 195 is such as to cause a raising and lowering of the forked end of said arm and thus to compensate for the arc through which the finger 192 moves when the arm 176 swings on its pivot 177. The forked end of the arm 193 permits the fingers 192 freely to move laterally into and out of engagement therewith when the turntable is intermittently indexed.

For rocking the shaft 197 in timed sequence with the strip-feeding mechanism, an upwardly extending lever 198 is mounted on said shaft and formed with a forked end adapted to engage a slide block 199 mounted upon the end portion of a pitman 200 between respective coiled springs 201, 202 mounted thereon, the other ends of said springs bearing against respective collars 203, 204 mounted upon said pitman. The other end of the pitman 200 is connected to the free end of a lever 205 fulcrumed upon the journal rod 73 and provided with a laterally-projecting cam roller 206 which extends into a cam groove 207 formed in the face of a cam 208 mounted upon the cam shaft 44. The cam groove 207 has a concentric portion 207$^a$ of relatively great length and radius adapting the cam to hold in an inclined position an arm 176 and through the spring 202 to hold a drum 170 on the said arm in yielding frictional driving engagement with the conveyor 48, and a concentric portion 207$^b$ of relatively short length and radius adapted to hold an arm 176 in vertical position to permit the finger 192 of said arm to move from the forked end of the arm 193 and another finger to move thereinto, as the turntable is indexed.

The turntable 179 is axially journaled upon a vertical stub shaft 209 rising from a suitable floor plate 210, and is supported upon a plurality of rollers 211, 211 journaled in respective brackets 212, 212 secured to the floor and uniformly arranged adjacent the periphery of the turntable.

For indexing the turntable periodically at determinate intervals with relation to the strip-feeding mechanism, a coaxial ratchet 213 is secured to the under side of the turntable 179 and has its teeth engaged by a spring-pressed pawl 214 (Fig. 2) mounted upon a radial arm 215 journaled upon the stub shaft 209. The arm 215 is oscillated, to rotate the turntable 179 through a determinate angle, by means of a link 216, which connects the free end of said arm with the free end of a lever arm 217 which lever arm has its other end mounted upon a rotatable sleeve 218 journaled upon a vertical post 219 which is secured to the floor and ceiling. A lever 220 extending from the sleeve 218 has its free end connected by a pitman 221 to the free end of a lever 222 fulcrumed on the journal rod 73 and provided with a laterally-projecting cam roller 223 which extends into a cam groove 224 formed in the face of a cam 225 mounted upon the cam shaft 44. The cam groove 224 includes a concentric major portion 224$^a$, a relatively short, inwardly-directed portion 224$^b$ in which the cam is adapted to move the pitman 221 forward to index the turntable 179 and thus to carry one drum 170 out of alignment with the conveyor 48 and a succeeding drum into alignment therewith, and a relatively short arcuate, outwardly-directed portion 224$^c$ for retracting the pitman 221 and moving other parts of the mechanism to inoperative position, ready for the next operative cycle.

The periphery of the turntable 179 is formed with a plurality of notches 225, 225 corresponding to the various drum mountings, and a spring-pressed detent 226 mounted in a floor bracket 227, yieldingly engages successive notches 225 as the turntable is indexed, to assure accurate positioning of the drums with relation to the strip conveyor 48.

In the operation of the apparatus, unvulcanized, plastic rubber stock 22 is fed into the calender 20 in the usual manner, and the strip 21 formed thereby, of greater width than desired for the article to be constructed therefrom, is continuously fed from the calender to the cooling drums 24, 25 and then into the storage or reserve loop 38 in a manner well known to the art.

From the storage loop 38 the strip 21 is intermittently drawn forward onto the conveyor 47, first passing through the margin-trimming device comprising the roll 80 and knives 81 where the strip is trimmed to exact width in such a manner that the resulting strip is properly positioned laterally of the conveyor 47 so as subsequently to be delivered to a tube-building drum in proper position with relation to the margins thereof.

The strip 21 is fed forward upon the conveyors 47, 48 driven in unison, and onto one of the drums 170 while the latter is yieldingly held against the delivery end of the conveyor 48 and frictionally driven thereby, and the axial movement of the drum causes the strip to be disposed in a helix thereon to provide a laminated structure having marginal portions of diminishing thickness from the edges due to the stepped relation of the edges of the respective plies. During this stage of operation the conveyors 47, 48 have their upper, strip-conveying reaches aligned in the same horizontal plane, the strip 21 passing freely across the narrow gap between the conveyors without appreciable sagging.

After sufficient strip material has been wrapped upon the drum and the material still on the conveyor 48 is just enough to complete the laminated structure being built upon said drum, the feed of the conveyors 47, 48 is stopped and the cutting bar 125 is raised to bring it into contact with the under side of the strip 21 and the disc knife 126 is propelled longitudinally of the bar to sever a portion from the continuous strip 21. The conveyor 48 is then driven forward independently of the conveyor 47 to feed the trailing end of the severed strip onto the drum 170 to complete the rubber structure thereon, the conveyor stopping as soon as this is effected. The arm 193 is then actuated to move the drum-supporting arm 176 to its normal vertical position as indicated by the broken lines of Fig. 14, and the turntable 179 is indexed to bring the succeeding arm 176 into position to be engaged by the arm 193, after which the latter is retracted to incline said arm 176 and thereby to force the drum 170 into engagement with the conveyor 48 to receive strip material 21 therefrom when the cycle of operation is repeated.

As soon as a strip is severed from the continuous strip 21 by the knife 126, the cutting bar 125 is lowered to its inoperative position, one end of the bar moving downward before the other to effect progressive separation of the bar and the strip 21 if any of the latter should adhere to the bar, the severed ends of the strip dropping evenly and smoothly upon the closely adjacent portions of the conveyors 47, 48 where the latter pass over the respective rollers 50, 103. The arm 53 is then actuated to carry the roller 50, and with it the delivery end of the conveyor 47 over and above the receiving end of the conveyor 48 and closely adjacent thereto, the operation being effected in the interval during which the conveyor 48 is driven independently of the conveyor 47 to deliver the trailing end of the severed strip to the drum as aforementioned.

The conveyors 47, 48 are then concurrently started to feed the leading end of the continuous strip 21 from the conveyor 47 to the conveyor 48 and therefrom onto the drum 170, upon which it is wrapped in the rotation of the drum effected by the conveyor, the roller 50 being restored to its normal position, to bring the conveyors 47, 48 into the same horizontal plane, during this strip-feeding operation. The conveyors 47, 48 are driven at the same surface speed so that the leading end of the continuous strip 21 passes smoothly and evenly onto the conveyor 48 without such formation of wrinkles in the strip as heretofore have been common occurrence in the use of apparatus of this general character.

This completes one cycle of operation, and the operations described may be repeated indefinitely, since the apparatus is automatic in operation and the only manual labor required is an operator to supply the calender and operators to perform the successive operations of building tubes from the laminated bands built upon the drums 170.

At the first station occupied by a building drum 170 after it is moved past the delivery end of the conveyor 48, the laminated rubber structure or band thereon is perforated at the drum aperture 174$^a$ an apertured valve pad affixed thereat, and the surface of the band, with the exception of one marginal portion, treated with a suitable dry or liquid adhesion-preventing material. At the succeeding station a valve stem is mounted in the band through the apertured valve pad and aperture 174$^a$, and the marginal portion of the band, that has been treated with the adhesion-preventing material, is folded over onto the middle zone of the band. At the next succeeding station the opposite, untreated margin of the band is folded over and lapped upon the first mentioned margin and rolled down into adhesive engagement therewith to form a compact and impervious circumferential seam. At the next succeeding station the hinged portion 174 of the drum is unlatched and swung inwardly, the finished tube is removed, and the hinged portion restored to its normal position so that the drum again is ready for engagement with the conveyor 48. Another station is provided where adhesion-preventing material may be applied to the drum surface if such is found necessary to prevent the strip 21 from adhering thereto, and where the drum may be rotated backward so that the retaining plate 188 abuts the journal portion 181 of the spindle 175 if such has not already been done incidently in the previous operations.

The apparatus is automatic in its operation and provides means whereby the several objects set forth in the statement of objects are attained.

The invention may be modified within the scope of the appended claims, and I do not limit my claims to the exact procedure described or specific construction shown.

I claim:

1. The method of making inner tubes which comprises feeding a continuous strip of tube-forming material across a gap to a tube-building station, stopping the feeding of the stock and severing a portion of the strip therefrom at the gap to provide a tube-building blank, and thereafter repositioning the leading end of the residual strip so as to permit it to be accurately guided across the gap and to the tube-building station during the initial phase of the succeeding feeding movement of the said residual strip.

2. The method of making tubes which comprises feeding a continuous strip of tube-forming material from a source of supply to a tube-building station, and trimming the lateral margins of the strip at a position relatively close to the tube-building station to assure a proper positioning of the strip when it arrives thereat.

3. Tube-building apparatus comprising means for feeding successive tube-forming strips of material to a tube-building station, and means for presenting tube-building forms in succession at said station in position to receive the respective strips thereon and to be driven by said strip-feeding means, means for feeding a continuous strip onto the first-mentioned strip-feeding means and means for severing successive portions therefrom to provide the successive tube-forming strips.

4. Tube-building apparatus as defined in claim 3 including means for driving the two strip-feeding means and the severing means in timed relation.

5. Tube-building apparatus comprising a pair of longitudinally spaced-apart conveyors for feeding a continuous strip of material from a source of supply to a tube-building station, one of the conveyors being adapted to draw the strips across a gap from the other and the two conveyors having their strip-conveying reaches normally in substantially the same plane, and means for raising the delivery end of the delivering conveyor above the receiving conveyor.

6. Tube-building apparatus comprising a pair of longitudinally spaced-apart conveyors for feeding a continuous strip of material from a source of supply to a tube-building station, one of the conveyors being adapted to draw the strips across a gap from the other and the two conveyors having their strip-conveying reaches normally in substantially the same plane, means for raising the delivery end of the delivering conveyor above the receiving conveyor and severing the continuous strip in the gap between the conveyors.

7. Tube-building apparatus comprising a pair of longitudinally spaced-apart conveyors adapted to cooperate for feeding a continuous strip of material, means in the gap between said conveyors for severing a portion from the continuous strip, and means associated with one of said conveyors and adapted to facilitate movement of the leading end of the residual portion of the continuous strip across said gap.

8. Tube-building apparatus comprising a pair of normally longitudinally spaced-apart conveyors adapted for feeding a continuous strip of material, means cooperating therewith for severing the continuous strip in the gap between said conveyors, means for positioning the delivery end of one of said conveyors over and above the receiving end of the other conveyor to carry the leading end of the continuous strip across said gap, and means for actuating the several said means in timed relation.

9. Tube-building apparatus comprising conveyor means for delivering a continuous strip of tube-building material from a source of supply to a tube-building form, and means associated with the conveyor means for severing surplus material from the marginal portions of said strip at the receiving end of said conveyor means to assure proper positioning of the strip upon said conveyor and to assure proper alignment of the strip with respect to the tube-building form.

10. Tube-building apparatus comprising a belt conveyor for delivering tube-forming material from a source of supply to a tube-building station, means for intermittently driving the same, a turret supporting a plurality of rotatable tube-building forms adapted to bring successive forms into alignment with said conveyor at said station, said forms being alternatively positionable on said turret and means for moving the respective forms relatively of the turret to bring them into association with the discharge end of the conveyor so as to be rotated thereby and to receive tube-building material therefrom.

11. Tube-building apparatus as defined in claim 10 together with means for actuating the form-manipulating means at timed intervals with relation to the intermittent conveyor-driving means.

12. Tube-building apparatus comprising a conveyor for delivering tube-forming material to a tube-forming station, a turret positioned adjacent the delivery end of said conveyor, a plurality of pivoted arms on said turret, tube-building drums journaled upon the free ends of the respective arms, means for indexing the turret to bring successive drums into alignment with the delivery end of the conveyor, and means for successively inclining the pivoted arms to draw the drums thereon into driving association with the delivery end of the conveyor.

13. Tube-building apparatus as defined in claim 12 together with means for driving the conveyor intermittently and means associated therewith for actuating the indexing means and the means for inclining the drum supports in timed relation to the intermittent movement of the conveyor.

In witness whereof I have hereunto set my hand this 23rd day of August, 1928.

HARVEY L. YOUNG.